(12) United States Patent
Mistry et al.

(10) Patent No.: US 7,052,538 B2
(45) Date of Patent: May 30, 2006

(54) TRISAZO DYES FOR INK JET PRINTING

(75) Inventors: Prahalad Manibhai Mistry, Manchester (GB); Roy Bradbury, Manchester (GB)

(73) Assignee: Avecia Limited, Manchester (GB)

( * ) Notice: Subject to any disclaimer, the term of this patent is extended or adjusted under 35 U.S.C. 154(b) by 0 days.

(21) Appl. No.: 10/513,750

(22) PCT Filed: May 8, 2003

(86) PCT No.: PCT/GB03/01981

§ 371 (c)(1),
(2), (4) Date: Nov. 9, 2004

(87) PCT Pub. No.: WO03/095562

PCT Pub. Date: Nov. 20, 2003

(65) Prior Publication Data

US 2005/0217535 A1    Oct. 6, 2005

(30) Foreign Application Priority Data

May 11, 2002   (GB) ................. 0210824.9

(51) Int. Cl.
*C09D 11/02* (2006.01)
*B41J 2/01* (2006.01)
(52) U.S. Cl. .................. 106/31.5; 106/31.78; 347/100
(58) Field of Classification Search ............... 103/31.5, 103/31.78; 534/754; 347/100; 428/195.1
See application file for complete search history.

(56) References Cited

U.S. PATENT DOCUMENTS

| | | | | |
|---|---|---|---|---|
| 2,163,251 A * | 6/1939 | Fritz | .................. | 534/754 |
| 2,676,957 A * | 4/1954 | Armento | .................. | 534/588 |
| 4,144,231 A * | 3/1979 | Bauer et al. | .................. | 534/665 |
| 4,426,432 A * | 1/1984 | Sawada et al. | .................. | 430/59.3 |
| 4,917,731 A * | 4/1990 | Bauer et al. | .................. | 106/31.5 |
| 5,215,578 A * | 6/1993 | Eida et al. | .................. | 106/31.48 |
| 5,423,906 A * | 6/1995 | Gregory et al. | .................. | 106/31.48 |
| 5,830,265 A | 11/1998 | Tsang et al. | .................. | 106/31.75 |
| 6,749,674 B1 * | 6/2004 | Geisenberger et al. | ... | 106/31.52 |
| 6,858,069 B1 * | 2/2005 | Aoyama et al. | .................. | 106/31.52 |
| 2001/0027734 A1 | 10/2001 | Geisenberger et al. | | |
| 2004/0020404 A1 * | 2/2004 | Popat et al. | .................. | 106/31.5 |
| 2004/0128775 A1 * | 7/2004 | Wuzik et al. | .................. | 8/583 |
| 2005/0076806 A1 * | 4/2005 | Hanmura et al. | .................. | 106/31.48 |
| 2005/0126435 A1 * | 6/2005 | Hanmura et al. | .................. | 106/31.46 |

FOREIGN PATENT DOCUMENTS

| | | |
|---|---|---|
| GB | 05955 | 1/1912 |
| JP | 55-144067 | 1/1981 |
| JP | 10-195320 | 7/1998 |
| WO | WO 02/094943 | 11/2002 |

* cited by examiner

*Primary Examiner*—Helene Klemanski
(74) *Attorney, Agent, or Firm*—Morgan Lewis & Bockius LLP

(57) ABSTRACT

A composition comprising a liquid medium and a compound of Formula (1) or salt thereof:

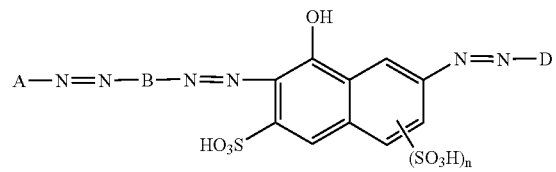

Formula (1)

wherein:
  A is optionally substituted phenyl or naphthyl provided A is not 2-sulpho-4-methoxyphenyl;
  B is optionally substituted phenylene or naphthylene;
  n is 0 or 1;
  D is a pyrazolonyl group; and
wherein the liquid medium comprises an organic solvent. Also claimed are inks comprising said compositions and processes for printing.

11 Claims, No Drawings

TRISAZO DYES FOR INK JET PRINTING

This invention relates to compounds suitable for use as dyes, to inks and to their use in ink jet printing ("IJP"). IJP is a non-impact printing technique in which droplets of ink are ejected through a fine nozzle onto a substrate without bringing the nozzle into contact with the substrate.

There are many demanding performance requirements for dyes and inks used in IJP. For example they desirably provide sharp, non-feathered images having good water-fastness, ozone-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

JP10195320 describes dyes including tris-azo dyes carrying a pyrazolyl azo group and their use in the coloration of paper and pulp.

U.S. patent application 2001/0027734 describes metal complexes of tris-azo dyes derived from tris-azo molecules optionally containing a (substituted) pyrazolylazo moiety. The copper complexes are said to be particularly preferred.

We have surprisingly found that certain un-metallised compounds provide valuable colorants for ink jet printing inks.

According to the invention, there is provided a composition comprising a liquid medium and a compound of Formula (1) or salt thereof:

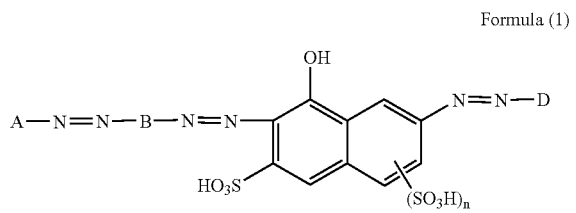

Formula (1)

wherein:
- A is optionally substituted phenyl or naphthyl provided A is not 2-sulpho-4-methoxyphenyl;
- B is optionally substituted phenylene or naphthylene;
- n is 0 or 1;
- D is a pyrazolonyl group; and wherein the liquid medium comprises an organic solvent.

Preferably A is optionally substituted phenyl provided A is not 2-sulpho-4-methoxyphenyl. It is also preferred that A is free from nitro groups when A is optionally substituted phenyl. The optional substituents on A are preferably selected from hydroxy, halo, nitro, cyano, carboxy, sulpho, phosphato, optionally substituted amino, optionally substituted acylamino, optionally substituted ureido, optionally substituted $C_{1-6}$-alkyl, optionally substituted $C_{1-6}$-alkoxy, optionally substituted $C_{1-10}$-alkylthio, optionally substituted aryl, optionally substituted $C_{1-6}$-alkyl sulphonyl and optionally substituted sulphonamido. Preferably A carries at least one water-solubilising group selected from carboxy, sulpho and phosphato.

As examples of optionally substituted phenyl and naphthyl groups represented by A there may be mentioned 3,5-dicarboxyphenyl, 4-sulphophenyl, 4-carboxyphenyl, 4-sulpho-2-carboxyphenyl, 3-sulpho-4-methoxyphenyl, 4-nitro-2-methylphenyl, 4-amino-2-sulphophenyl, 2-sulpho-4-acetamidophenyl, 2-carboxy-4-acetamidophenyl, 6-sulphonaphth-1-ylene and 7-sulphonaphth-1-ylene.

The optional substituents on B are preferably selected from carboxy, sulpho, phosphato, optionally substituted amino, acylamino, optionally substituted ureido, optionally substituted alkyl, optionally substituted alkoxy and optionally substituted aryl.

When B is substituted phenylene it preferably carries one or more groups selected from optionally substituted $C_{1-6}$-alkyl, optionally substituted $C_{1-6}$-alkylthio, optionally substituted $C_{1-6}$-alkoxy, optionally substituted amino, optionally substituted ureido, carboxy and sulphato. When B is optionally substituted naphthylene the naphthylene ring preferably carries one or more water solubilising groups, more preferably by one or two groups selected from carboxyl, sulphonic and phosphonic acid groups.

As examples of optionally substituted phenylene and naphthylene groups represented by B there may be mentioned 7-sulphonaphth-1,4-ylene, naphth-1,4-ylene, 2,5-dimethoxyphen-1,4-ylene, 2,5-di(2-hydroxyethoxy)phen-1,4-ylene and 2-methoxy-5-methylphen-1,4-ylene.

Preferably D is a pyrazolonyl group carrying at least one carboxy, sulpho or phosphato group. In another embodiment, D is preferably a pyrazolonyl group of Formula (2a) or Formula (2b):

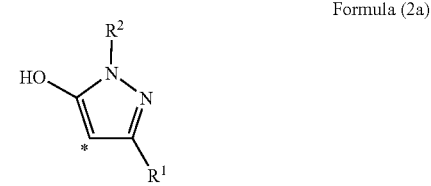

Formula (2a)

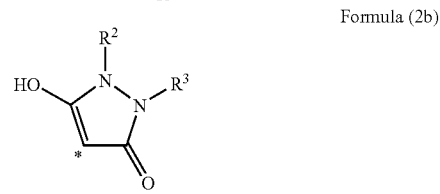

Formula (2b)

wherein
- $R^1$ is H, carboxy, or optionally substituted alkyl, alkoxy, acyl, aryl, amino or amido; and
- $R^2$ and $R^3$ are each independently H or optionally substituted aryl or alkyl and the asterisk * shows the point of attachment to the azo linkage in Formula (1).

$R^1$ is preferably an optionally substituted $C_{1-6}$-alkyl, $C_{1-6}$-acyl or amino group or a group capable of hydrogen bonding with the adjacent azo group such as carboxy. More preferably $R^1$ is carboxy.

Preferred optionally substituted $C_{1-6}$-alkyl groups are optionally substituted $C_{1-4}$-alkyl, more preferably $C_{1-4}$-alkyl which is unsubstituted or carries a carboxy, sulpho or phosphato group.

Preferred optionally substituted $C_{1-6}$-alkoxy groups are optionally substituted $C_{1-4}$-alkyl, more preferably $C_{1-4}$-alkyl which is unsubstituted or carries a carboxy, sulpho or phosphato group.

Preferred optionally substituted phenyl groups are those mentioned above for A.

Preferred optionally substituted sulphonamide groups are of the formula $SO_2NR^4R^5$ wherein $R^4$ and $R^5$ are each independently H, optionally substituted $C_{1-6}$-alkyl.

Preferred optionally substituted amino groups are optionally substituted acylamino, especially $C_{1-4}$-acylamino, more preferably optionally substituted ureido which is unsubstituted or carries a carboxy, sulpho or phosphato group.

Preferably acyl groups are optionally substituted $C_{1-4}$alkylacyl, optionally substituted phenylacyl, preferably acetyl or benzoyl.

As examples of groups represented by $R^1$ there may be mentioned methyl, carboxy and H.

$R^2$ and $R^3$ are preferably each independently an optionally substituted aryl group, more preferably phenyl or phenyl carrying one or two substituents selected from carboxy and sulpho.

As examples of groups represented by $R^2$ and $R^3$ there may be mentioned phenyl, 3-sulphophenyl and 4-sulphophenyl.

In view of the above preferences, in a preferred embodiment:
  A is phenyl carrying one or two substituents selected from carboxy, sulpho, phosphato, amino, methyl, methoxy and acetamido, provided that A is not 2-sulpho-4-methoxyphenyl;
  B is phenylene or naphthylene carrying one or two substituents selected from sulpho, methyl, methoxy and 2-hydroxyethoxy;
  n is 0 or 1;
  D is of Formula (2a) or (2b);
  $R^1$ is H, methyl or carboxy; and
  $R^2$ and $R^3$ are each independently phenyl or phenyl carrying one or two substituents selected from sulpho and carboxy.

The compounds of Formula (1) may be prepared by diazotising a compound of the Formula (3) wherein n, A and B are as hereinbefore defined to give a diazonium salt and coupling the resultant diazonium salt with a compound of Formula H-D wherein D is of Formula (2a) or (2b) as hereinbefore defined:

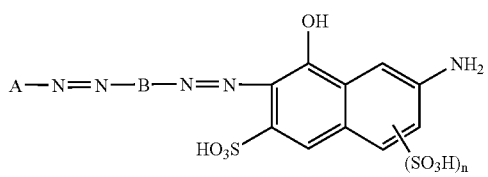

Formula (3)

The diazotisation is preferably performed at a temperature of 0° C. to 10° C. Preferably the diazotisation is performed in water, preferably at a pH below 7. Dilute mineral acid, e.g. HCl or $H_2SO_4$, may be used to achieve the desired pH conditions.

The compound of Formula (3) may be prepared by diazotising a compound of Formula $A-N=N-B-NH_2$ to give a diazonium salt and coupling the resultant diazonium salt with 1-hydroxy-3-sulpho-7-amino naphthylene optionally carrying a sulpho group at the 5-, 6- or 8-position, wherein A and B are as hereinbefore defined. Reaction conditions are those generally used in the dyestuff art, for example as described in for example EP 0356080.

When the compound of Formula (1) is in the form of a salt the preferred salts are alkali metal salts (especially lithium, sodium and potassium salts), ammonium and substituted ammonium salts and mixtures thereof. Especially preferred salts are sodium, potassium and lithium salts, salts with ammonia and volatile amines and mixtures thereof. The lithium salts have good solubility, forming particularly storage stable inks with low toxicity and no tendency to block ink jet nozzles.

The compounds may be converted into a desired salt using known techniques. For example, an alkali metal salt of a compound may be converted into the ammonium or substituted ammonia salt by dissolving an alkali metal salt of the compound in water, acidifying with a mineral acid and adjusting the pH of the solution to pH 9 to 9.5 with ammonia or the amine and removing the alkali metal cations by dialysis or by use of an ion exchange resin.

Examples of amines which may be used to form such salts include methylamine, dimethylamine, trimethylamine, ethylamine, n-propylamine, iso-propylamine, n-butylamine, iso-butylamine, sec-butylamine, tert-butylamine, piperidine, pyridine, morpholine, allylamine, diethylamine, triethylamine, tetramethyl amine and mixtures thereof. It is not essential that the dyes are completely in the form of the ammonium salt or substituted ammonium salt and mixed alkali metal and either ammonium salt or substituted ammonium salt are effective, especially those in which at least 50% of the cations are ammonium or substituted ammonium ions.

Still further salts are those with the counter ions described in U.S. Pat. No. 5,830,265, claim 1, integer (b), which are included herein by reference thereto.

The compounds of Formula (1) may exist in tautomeric forms other than those shown in this specification. These tautomers are included within the scope of the present claims.

A preferred composition comprises:
  (a) from 0.01 to 30 parts of a compound of Formula (1) or salt thereof; and
  (b) from 70 to 99.99 parts of a liquid medium;

wherein the liquid medium comprises an organic solvent and all parts are by weight and the number of parts of (a)+(b)= 100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts. Preferably component (a) is completely dissolved in component (b). Preferably component (a) has a solubility in component (b) at 20° C. of at least 10%. This allows the preparation of liquid dye concentrates which may be used to prepare inks and reduces the chance of the dye precipitating if evaporation of the liquid medium occurs during storage.

Preferred liquid media comprise water and an organic solvent, preferably in a weight ratio of water to organic solvent of 99:1 to 1:99, more preferably 99:1 to 50:50 and especially 95:5 to 80:20.

It is preferred that the organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-soluble organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono- $C_{1-4}$-alkyl and $C_{1-4}$-alkyl ethers of diols, more preferably mono- $C_{1-4}$-alkyl ethers of diols having 2 to 12 carbon atoms, especially ((2-methoxy-2)-ethoxy)-2-ethoxyethanol.

The dyes of the invention may be used as the sole colorant in inks because of their attractive black shade. However, if desired, one may combine the present compounds with one or more further colorants if a slightly different shade is required for a particular end use. The further colorants are preferably dyes. When further colorants are included in the ink these are preferably selected from black, magenta and yellow colorants and combinations thereof.

Suitable further black colorants include C.I. Food Black 2, C.I. Direct Black 19, C.I. Reactive Black 31, PRO-JET™ Fast Black 2, C.I. Direct Black 195; C.I. Direct Black 168; and black dyes described in patents by Lexmark (e.g. EP 0 539,178 A2, Example 1, 2, 3, 4 and 5), Orient Chemicals (e.g. EP 0 347 803 A2, pages 5-6, azo dyes 3, 4, 5, 6, 7, 8, 12, 13, 14, 15 and 16) and Seiko Epson Corporation.

Suitable further magenta colorants include PRO-JET™ Fast Magenta 2.

Suitable further yellow colorants include C.I. Direct Yellow 142; C.I. Direct Yellow 132; C.I. Direct Yellow 86; C.I. Direct Yellow 85; C.I. Direct Yellow 173; and C.I. Acid Yellow 23.

The ink may also contain additional components conventionally used in ink jet printing inks, for example viscosity and surface tension modifiers, corrosion inhibitors, biocides, kogation reducing additives and surfactants which may be ionic or non-ionic.

The pH of the composition is preferably from 4 to 11, more preferably from 7 to 10.

The viscosity of the composition at 25° C. is preferably less than 50 cP, more preferably less than 20 cP and especially less than 5 cP.

When the compositions according to the invention are used as ink jet printing compositions, the composition preferably has a concentration of halide ions of less than 500 parts per million, more preferably less than 100 parts per million. It is especially preferred that the composition has less than 100, more preferably less than 50 parts per million of divalent and trivalent metals, wherein parts refer to parts by weight relative to the total weight of the composition. We have found that purifying the compositions to reduce the concentration of these undesirable ions reduces nozzle blockage in ink jet printing heads, particularly in thermal ink jet printers.

According to the second aspect of the present invention there is provided a compound of Formula (1) with the proviso that when A is optionally substituted phenyl, A is free from nitro groups. The preferences for A, B, n and D in dyes according the second aspect of the present invention are as described above in relation to the compositions, with the proviso that A is free from nitro groups when A is optionally substituted phenyl.

A further aspect of the invention provides a process for printing an image on a substrate comprising applying thereto a composition according to the first aspect of the present invention to the substrate by means of an ink jet printer.

The ink jet printer preferably applies the composition to the substrate in the form of droplets which are ejected through a small orifice onto the substrate. Preferred ink jet printers are piezoelectric ink jet printers and thermal ink jet printers. In thermal ink jet printers, programmed pulses of heat are applied to the composition in a reservoir by means of a resistor adjacent to the orifice, thereby causing the composition to be ejected in the form of small droplets directed towards the substrate during relative movement between the substrate and the orifice. In piezoelectric ink jet printers the oscillation of a small crystal causes ejection of the composition from the orifice.

The substrate is preferably paper, plastic, a textile, metal or glass, more preferably a treated substrate such as a coated paper or coated plastic, especially coated paper. Preferred plain or treated papers are papers which may have an acid, alkaline or neutral character. Examples of commercially available treated papers include HP Premium Coated Paper, HP Photopaper (both available from Hewlett Packard Inc.); Stylus Pro 720 dpi Coated Paper, Epson Photo Quality Glossy Film, Epson Photo Quality Glossy Paper (all available from Seiko Epson Corp.); Canon HR 101 High Resolution Paper, Canon GP 201 Glossy Paper, Canon HG 101 and HG201 High Gloss Film and Canon PR101 (all available from Canon).

A further aspect of the present invention provides a paper, an overhead projector slide or a textile material printed with a composition, a compound or by means of a process as hereinbefore defined.

A still further aspect of the present invention provides an ink jet printer cartridge, optionally refillable, comprising one or more chambers and a composition, wherein the composition is present in at least one of the chambers and the composition is according to the second aspect of the invention.

The present compounds and compositions provide prints of attractive, neutral black shades which are particularly well suited for the ink jet printing of text and images. The compositions have good storage stability and low tendency to block the very fine nozzles used in ink jet printers. Furthermore, the resultant images have good optical density, light-fastness, wet-fastness and resistance to fading in the presence of oxidising air pollutants. This is achieved without the need for copper or other transition metals used in the dyes of US 2001/0027734. As a result the dyes of the present invention are simpler to make and more environmentally friendly than the metallised dyes of U.S. 2001/0027734.

The invention is further illustrated by the following Examples in which all parts and percentages are by weight unless specified otherwise.

EXAMPLE 1

Preparation of

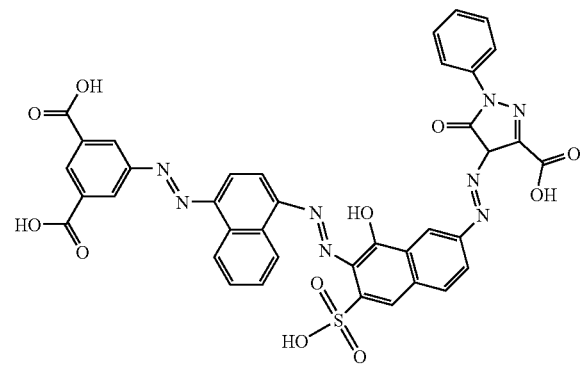

Stage A—1-Amino-4-(3,5-dicarboxyphenylazo)naphthalene

5-Aminoisophthalic acid (18.1 g, 0.1M) was stirred in water (150 ml) at room temperature and 2N NaOH added to form a solution at pH 8.0. 2N NaNO$_2$ solution (50 ml) was added and the mixture stirred to homogenise. The solution was added gradually to a mixture of ice/water (150 ml) and 36% HCl (40 ml) at 5° C. and the resulting suspension stirred for 2 hours at 0–10° C. Sulphamic acid solution (10%) was added in order to remove excess nitrous acid.

1-Naphthylamine (14.3 g, 0.1M) was dissolved in water (300 ml) and 36% HCl (15 ml) at 70° C. and cooled to room temperature. The resulting suspension was added to the above diazo suspension at 0–10° C. and the pH adjusted to 4.5 by the addition of sodium acetate. The mixture was stirred for 18 hours and the dye collected by filtration and washed with water (100 ml).

Stage B —1-hydroxy-2-(4-[3,5-dicarboxy-phenylazo]-7-sulpho-naphth-1-ylazo)-3-sulpho-7-aminonaphthalene The paste from Stage 1 (0.1M) was dissolved in water (100 ml) and 2N NaOH solution at pH 9.0. 2N NaNO$_2$ solution (50 ml) was added and the mixture stirred 3 minutes. The solution was added gradually to a mixture of ice/water (150 ml) and 36% HCl (40 ml) at 5° C. using rapid agitation. The resulting suspension was stirred 1 h at 5° C. Sulphamic acid solution (10%) was added in order to remove excess nitrous acid.

Gamma acid (23.9 g, 0.1M) was dissolved in water (150 ml) and 2N NaOH solution at pH 9.0. Na$_2$CO$_3$ (10 g) was added and the solution cooled to 0–10° C. To this was added the above diazo suspension, while holding the pH at 9.5 to pH 10 with 20% Na$_2$CO$_3$ solution. The solution was stirred for 1 hour at 0–10° C. and the pH adjusted to 5.5 by the addition of glacial acetic acid.

The precipitated dye was collected by filtration and washed with dilute acetic acid solution (5%). The paste was redissolved in water (150 ml) and 2N NaOH solution at pH 9.0. The solution was heated to 50° C. and NaCl (15% w/v) added and the precipitated dye collected by filtration and washed with 20% NaCl solution (100 ml). The product was the tetrasodium salt of 1-hydroxy-2-(4-[3,5-dicarboxy-phenylazo]-7-sulpho-naphth-1-ylazo)-3-sulpho-7-aminonaphthalene.

Stage C—Title Dye

The product obtained by following Stage B (12.7 g) and sodium nitrite (1.52 g) were dissolved in water (400 ml). The solution was added to a mixture of ice-water (50 g) to which hydrochloric acid (7 ml) had been added. The mixture was then stirred for 2 hrs maintaining the temperature below 10° C. to effect diazotisation. At the end of this time the excess nitrous acid was destroyed by the addition of sulphamic acid. The resultant diazonium salt suspension was then slowly added to a solution of 1-phenyl-5-pyrazolone-3-carboxylic acid (4.51 g, obtained from Pfaltz & Bauer) in water (200 ml) at pH 7 (lithium hydroxide) at 0–10° C., maintaining the pH at 6–7 by addition of lithium hydroxide (2 M). After stirring for a further 1 hour the temperature is raised to 30° C. and lithium chloride 25% w/v was added (exothermic). The stirred suspension was allowed to self-cool to 50° C. and the product then isolated by filtration. After washing with lithium chloride solution (1 l, 30% w/v) the product was further purified by dissolving in water (500 ml) and adding acetone (1 l). The title product has then isolated by filtration, washed with acetone, dissolved in water, dialysed to low conductivity before evaporating to dryness. The title product had a $\lambda_{max}$ 578 nm ($\epsilon_{max}$ 49000).

EXAMPLES 2 TO 10

The method of Example 1 was repeated except that, where indicated in Table 1 below, 1-naphthylamine was replaced by the amine shown in Column B, and the pyrazolone used in place of 1-phenyl-5-pyrazolone-3-carboxylic acid was of Formula (2a) as hereinbefore defined wherein $R^1$ and $R^2$ are as defined in Table 1. The marking "N/A" means the corresponding material from Example 1 was used. The structure of the resultant dye is also shown in Table 1.

TABLE 1

| Ex. | B | R¹ | R² | Dye | $\lambda_{max}$ (nm) ($\epsilon_{max}$) |
|---|---|---|---|---|---|
| 2 | 8-amino-2-naphthalenesulfonic acid | CH₃ | 3-methylbenzenesulfonic acid | (structure) | 572 |
| 3 | N/A | CH₃ | 3-methylbenzenesulfonic acid | (structure) | 570 (31000) |
| 4 | 8-amino-2-naphthalenesulfonic acid | N/A | N/A | (structure) | 578 (50000) |
| 5 | 8-amino-2-naphthalenesulfonic acid | CO₂H | 4-methylbenzenesulfonic acid | (structure) | 577 (54000) |

TABLE 1-continued

| Ex. | B | R¹ | R² | Dye | $\lambda_{max}$ (nm) ($\epsilon_{max}$) |
|---|---|---|---|---|---|
| 6 | 8-amino-2-naphthalenesulfonic acid (1-NH₂, 7-SO₃H naphthalene) | CH₃ | 4-methylbenzenesulfonic acid (p-toluenesulfonic acid) | (structure) | 579 (46000) |
| 7 | 8-amino-2-naphthalenesulfonic acid | CO₂H | 3-methylbenzenesulfonic acid (m-toluenesulfonic acid) | (structure) | 580 (55000) |
| 8 | 2,5-dimethoxyaniline | CO₂H | N/A | (structure) | |
| 9 | 2,5-dimethoxyaniline | CH₃ | 3-methylbenzenesulfonic acid | (structure) | |

TABLE 1-continued

| Ex. | B | R¹ | R² | Dye | $\lambda_{max}$ (nm) ($\epsilon_{max}$) |
|---|---|---|---|---|---|
| 10 | [2,5-bis(2-hydroxyethoxy)aniline structure with OC₂H₄OH, NH₂, OC₂H₄OH] | CO₂H | [4-methylbenzenesulfonic acid / p-toluenesulfonic acid structure with SO₃H] | [complex dye structure] | 588 (55000) |

EXAMPLES 11 TO 22

The method of Example 1 was repeated except that, where indicated in Tables 2 and 3 below, 5-aminoisophthalic acid was replaced by the amine indicated in Column A, 1-naphthylamine was replaced by the amine indicated in Column B and a pyrazolone of Formula (2a) as hereinbefore defined was used in place of 1-phenyl-5-pyrazolone-3-carboxylic acid, wherein R¹ and R² are as defined in Tables 2 and 3. The marking "N/A" means the corresponding material from Example 1 was used. In Table 3, the dyes were prepared as described above, but 1-hydroxy-8-amino-naphthalene-3,6-disulphonic acid was used in place of 1-hydroxy-6-amino-naphthalene-3-sulphonic acid in Stage B. The structure of the resultant dye is also shown.

TABLE 2

| Ex. | A | B | R¹ |
|---|---|---|---|
| 11 | [2,4-diaminobenzenesulfonic acid structure: SO₃H, NH₂, H₂N] | [8-amino-naphthalene-2-sulfonic acid structure: NH₂, SO₃H] | CO₂H |
| 12 | [2,4-diaminobenzenesulfonic acid structure: SO₃H, NH₂, H₂N] | [2,5-bis(2-hydroxyethoxy)aniline structure: OC₂H₄OH, NH₂, OC₂H₄OH] | CO₂H |
| 13 | [proline-sulfonyl-aniline structure: COOH, N, S(=O)₂, NH₂] | [2,5-dimethoxy-aniline structure: O-CH₃, NH₂, H₃C-O] | CO₂H |

TABLE 2-continued
| Ex. | | | |
|---|---|---|---|
| 14 | 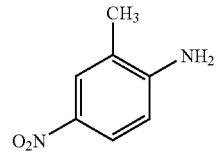 | 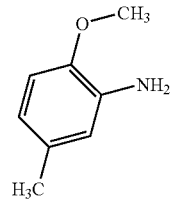 | CO₂H |
| 15 | 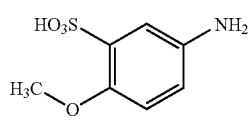 | 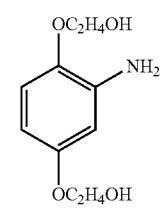 | CO₂H |
| 16 | 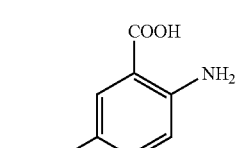 | 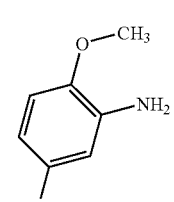 | CO₂H |
| Ex. | R² | Dye | λ$_{max}$ (nm) (ε$_{max}$) |
|---|---|---|---|
| 11 | 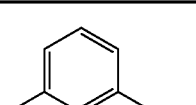 | 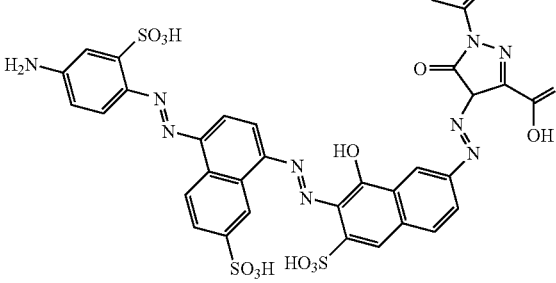 | 600 (61000) |
| 12 | 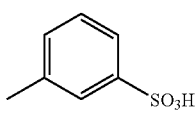 | 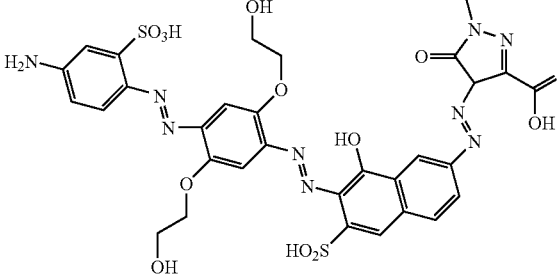 | 616 (53000) |

TABLE 2-continued
| 13 | N/A | 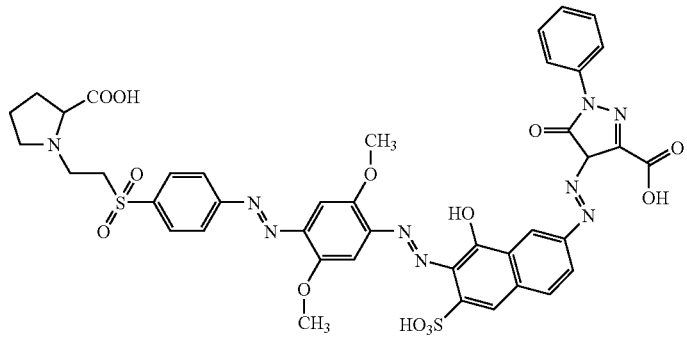 |
| 14 | 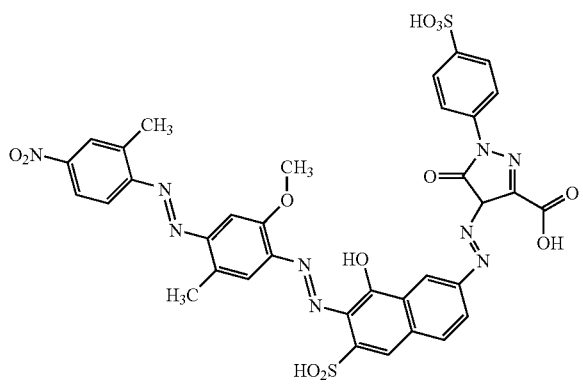 |
| 15 | 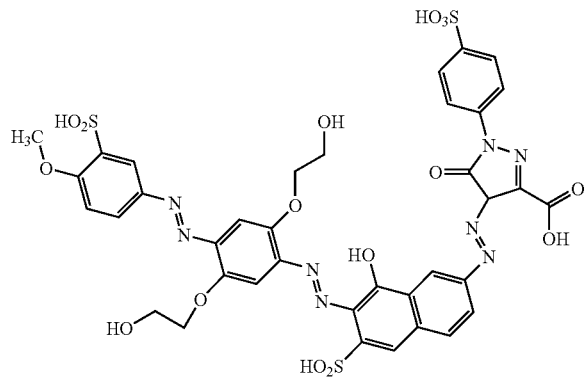 |
| 16 | 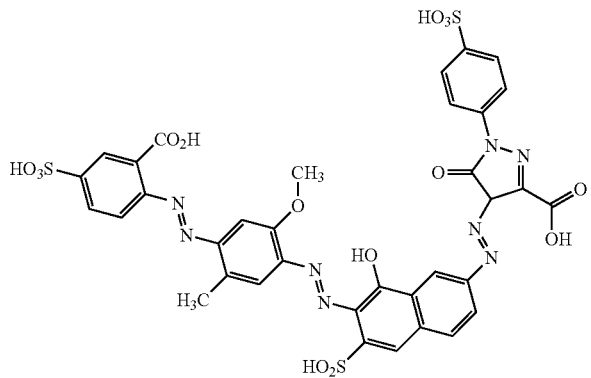 |

TABLE 3
| Ex. | A | B | R¹ |
|---|---|---|---|
| 17 | 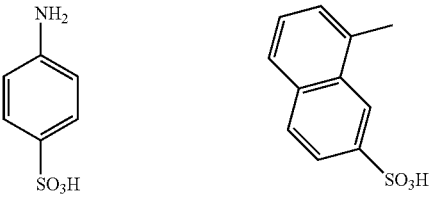 | 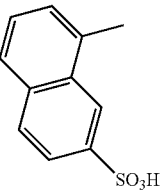 | CO₂H |
| 18 | 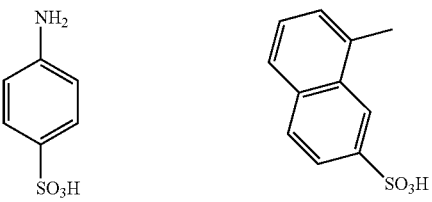 | 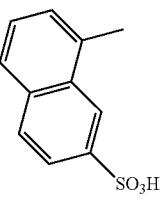 | CO₂H |
| 19 | 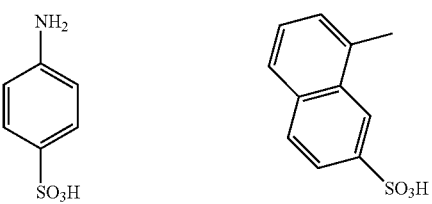 | 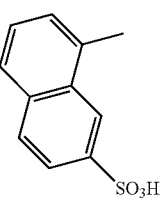 | CO₂H |
| 20 | 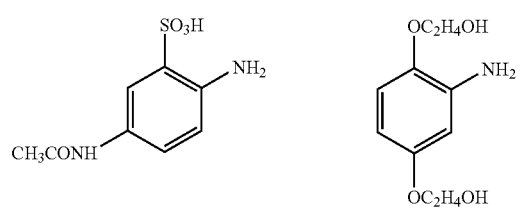 | 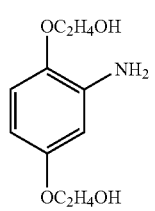 | CO₂H |
| 21 | 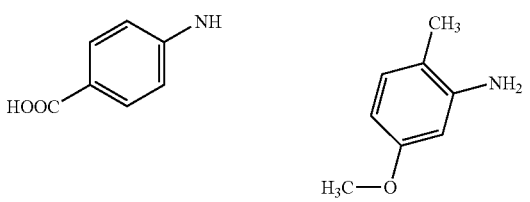 | 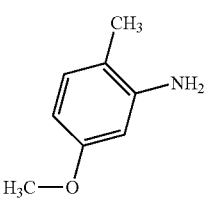 | CO₂H |
| 22 | 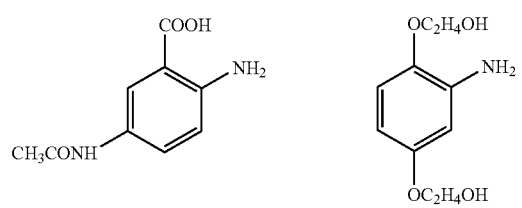 | 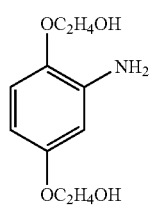 | CO₂H |

TABLE 3-continued

| Ex. | R² | Dye | λ_max (nm) (ε_max) |
|---|---|---|---|
| 17 | 3-methylbenzenesulfonic acid | (structure) | 574 (56000) |
| 18 | N/A | (structure) | 576 (51000) |
| 19 | 4-methylbenzenesulfonic acid | (structure) | — |
| 20 | 4-methylbenzenesulfonic acid | (structure) | 594 (55000) |

TABLE 3-continued

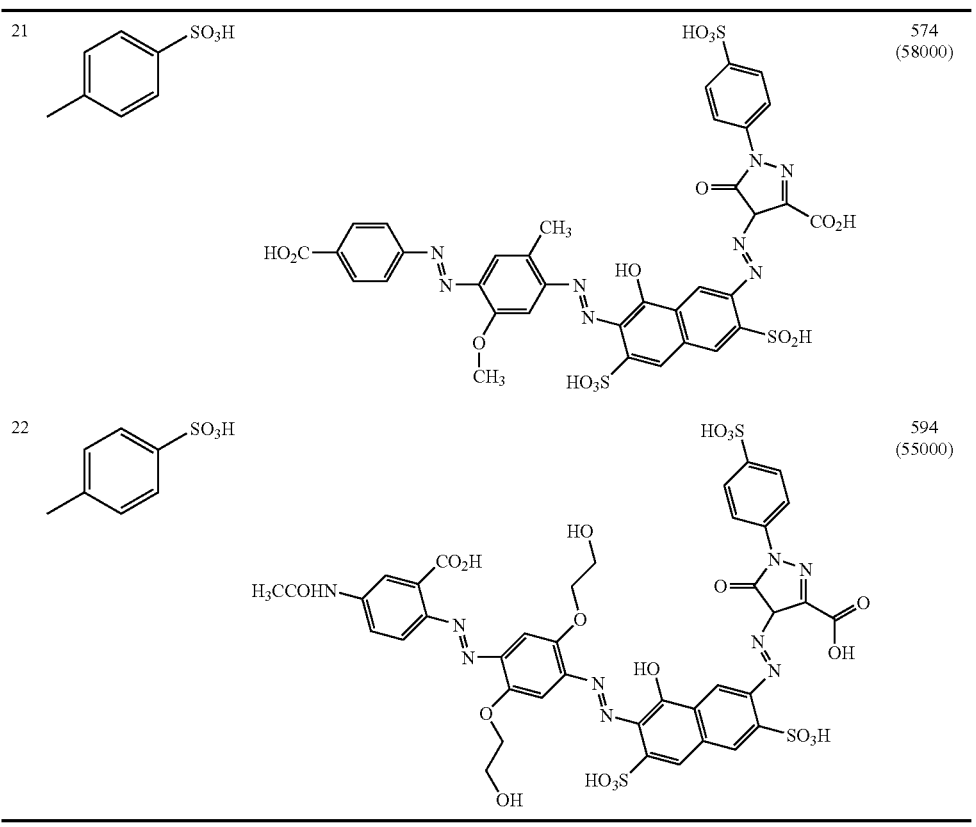

EXAMPLE 23

Inks

Inks were prepared containing the dyes from Examples 12, 14, 15 and 19 according to the following formulation:

| | |
|---|---|
| 2-Pyrrolidone | 5 parts |
| Thiodiglycol | 5 parts |
| Surfynol™ 465 | 1 part |
| Dye | 3.5 parts |
| Water | amount required to make up to 100 parts |

Surfynol™ 465 is a surfactant available from Air Products and Chemicals Inc., USA. Further inks may be prepared according to Tables 4 and 5 wherein the dye described in the first column is the dye made in the above example of the same number. Numbers quoted in the second column onwards refer to the number of parts of the relevant ingredient and all parts are by weight. The inks may be applied to paper by thermal or piezo ink jet printing.

The following abbreviations are used in Tables 4 and 5:
PG=propylene glycol
DEG=diethylene glycol
NMP=N-methylpyrollidone
DMK=dimethylketone
IPA=isopropanol
MEOH=methanol
2P=2-pyrollidone
MIBK=methylisobutyl ketone
P12=propane-1,2-diol
BDL=butane-2,3-diol
CET=cetyl ammonium bromide
PHO=$Na_2HPO_4$
TBT=tertiary butanol
TDG=thiodiglycol

TABLE 4

| Dye | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | | |
| 3 | 10.0 | 85 | 3 | | 3 | 3 | | | | 5 | 1 | |
| 4 | 2.1 | 91 | | 8 | | | | | | | | 1 |
| 5 | 3.1 | 86 | 5 | | | | | 0.2 | 4 | | | 5 |
| 6 | 1.1 | 81 | | | 9 | | 0.5 | 0.5 | | | 9 | |
| 7 | 2.5 | 60 | 4 | 15 | 3 | 3 | | | 6 | 10 | 5 | 4 |

TABLE 4-continued

| Dye | Dye Content | Water | PG | DEG | NMP | DMK | NaOH | Na Stearate | IPA | MEOH | 2P | MIBK |
|---|---|---|---|---|---|---|---|---|---|---|---|---|
| 8 | 5 | 65 | | 20 | | | | | 10 | | | |
| 9 | 2.4 | 75 | 5 | 4 | | 5 | | | | 6 | | 5 |
| 10 | 4.1 | 80 | 3 | 5 | 2 | 10 | | 0.3 | | | | |
| 11 | 3.2 | 65 | | 5 | 4 | 6 | | | 5 | 4 | 6 | 5 |
| 12 | 5.1 | 96 | | | | | | | | 4 | | |
| 13 | 10.8 | 90 | 5 | | | | | | 5 | | | |
| 14 | 10.0 | 80 | 2 | 6 | 2 | 5 | | | 1 | | 4 | |
| 15 | 1.8 | 80 | | 5 | | | | | | | 15 | |
| 16 | 2.6 | 84 | | | 11 | | | | | | 5 | |
| 17 | 3.3 | 80 | 2 | | | 10 | | | | 2 | | 6 |
| 18 | 12.0 | 90 | | | | 7 | 0.3 | | 3 | | | |
| 19 | 5.4 | 69 | 2 | 20 | 2 | 1 | | | | | 3 | 3 |
| 20 | 6.0 | 91 | | | 4 | | | | | 5 | | |

TABLE 5

| Dye | Dye Content | Water | PG | DEG | NMP | CET | TBT | TDG | BDL | PHO | 2P | PI2 |
|---|---|---|---|---|---|---|---|---|---|---|---|---|
| 21 | 3.0 | 80 | 15 | | | 0.2 | | | | | 5 | |
| 22 | 9.0 | 90 | | 5 | | | | | | 1.2 | | 5 |
| 15 | 2.0 | 90 | | 10 | | | | | | | | |
| 1 | 2 | 88 | | | | | | 10 | | | | |
| 2 | 5 | 78 | | | 5 | | | 12 | | 5 | | |
| 1 | 8 | 70 | 2 | | 8 | | | 15 | | 5 | | |
| 1 | 10 | 80 | | 10 | | | | 8 | | 12 | | |
| 1 | 10 | 80 | | | | | | | | | | |

EXAMPLE 24

Ink Jet Printing

The inks described in Example 23 were ink-jet printed onto a variety of papers using a Hewlett Packard DeskJet 560C™. The CIE colour co-ordinates of each print (a, b, L, Chroma (C) and hue (H)) were measured using a Gretag Spectrolino Spectrodensitometer™ with 0°/45° measuring geometry with a spectral range of 400–700 nm at 20 nm spectral intervals, using illuminant D50 with a 2° (CIE 1931) observer angle and a density operation of status A. No less than 2 measurements were taken diagonally across a solid colour block on the print with a size greater than 10 mm×10 mm. The properties of the resultant prints are shown in Table 6, where the example number of the dye used to prepare the ink is indicated in the left hand column.

The substrates used in Tables 6, 7 and 8 were as follows:

| Substrate | Substrate Number: |
|---|---|
| Xerox 4024 ™ | 1 |
| HG 201 ™ | 2 |
| PR101 ™ MkII | 3 |
| HP Premium Plus ™ MkII | 4 |
| SEC Premium Photo ™ | 5 |

TABLE 6

| Example No. | SUBSTRATE | ROD | L | a | b | C | H |
|---|---|---|---|---|---|---|---|
| 12 | 1 | 1.08 | 35 | −4 | −2 | 5 | 209 |
| 12 | 2 | 2.10 | 8 | −5 | −3 | 6 | 213 |

TABLE 6-continued

| Example No. | SUBSTRATE | ROD | L | a | b | C | H |
|---|---|---|---|---|---|---|---|
| 12 | 3 | 1.86 | 12 | −4 | −7 | 8 | 241 |
| 12 | 4 | 1.94 | 10 | −5 | −1 | 5 | 188 |
| 12 | 5 | 1.80 | 14 | −7 | −2 | 7 | 200 |
| 14 | 1 | 1.10 | 34 | −3 | −4 | 5 | 236 |
| 14 | 2 | 2.26 | 5 | 0 | −5 | 5 | 266 |
| 14 | 3 | 1.99 | 10 | −2 | −9 | 9 | 255 |
| 14 | 4 | 2.17 | 6 | −2 | −3 | 4 | 239 |
| 14 | 5 | 2.03 | 9 | −3 | −7 | 7 | 250 |
| 15 | 1 | 1.07 | 36 | −5 | −3 | 6 | 205 |
| 15 | 2 | 1.77 | 15 | −10 | 0 | 10 | 182 |
| 15 | 3 | 1.77 | 14 | −4 | −6 | 7 | 239 |
| 15 | 4 | 1.89 | 12 | −5 | −2 | 5 | 198 |
| 15 | 5 | 1.71 | 16 | −10 | −4 | 10 | 201 |
| 19 | 1 | 1.05 | 36 | 4 | −4 | 6 | 319 |
| 19 | 2 | 2.21 | 5 | 5 | −1 | 5 | 347 |
| 19 | 3 | 2.09 | 7 | 6 | −2 | 6 | 339 |
| 19 | 4 | 1.68 | 15 | 6 | 2 | 6 | 19 |
| 19 | 5 | 1.94 | 9 | 7 | 0 | 7 | 360 |

Light-Fastness:

To evaluate light fastness the prints were irradiated in an Atlas Ci5000 Weatherometer™ for 100 hours. The results are shown in Table 7 where the example number of the dye used to prepare the ink is indicated in the left hand column. The degree of fade is expressed as $\Delta E$ where a lower figure indicates higher light fastness, and $\Delta E$ is defined as the overall change in the CIE colour co-ordinates L, a, b of the print and is expressed by the equation $\Delta E = (\Delta L^2 + \Delta a^2 + \Delta b^2)^{0.5}$.

TABLE 7

| Example No. | SUBSTRATE | ΔE |
|---|---|---|
| 12 | 1 | 17 |
| 12 | 2 | 80 |
| 12 | 3 | 56 |
| 12 | 4 | 14 |
| 12 | 5 | 22 |
| 14 | 1 | 16 |
| 14 | 2 | 45 |
| 14 | 3 | 44 |
| 14 | 4 | 21 |
| 14 | 5 | 14 |
| 15 | 1 | 18 |
| 15 | 2 | 72 |
| 15 | 3 | 52 |
| 15 | 4 | 25 |
| 15 | 5 | 15 |
| 19 | 1 | 18 |
| 19 | 2 | 20 |
| 19 | 3 | 48 |
| 19 | 4 | 14 |
| 19 | 5 | 31 |

Ozone-Fastness:

The inks prepared in Example 23 were printed onto the substrates indicated in Table 8 using a HP560™ ink jet printer. The printed substrates were then assessed for ozone fastness using an ozone test cabinet from Hampden Test Equipment. The exposures to ozone were carried out for 24 hours at 40° C. and 50% relative humidity in the presence of 1 part per million of ozone. Ozone-fastness was judged by measuring the optical density before and after exposure to ozone using a Gretag Spectrolino Spectrodensitometer™. Thus the lower the % OD loss the greater the ozone fastness. The results are shown in Table 8 where the example number of the dye used to prepare the ink is indicated in the left hand column. These clearly demonstrate that inks based on compositions of this invention display good ozone fastness.

TABLE 8

| Example No. | SUBSTRATE | % OD LOSS |
|---|---|---|
| 12 | 1 | 2 |
| 12 | 2 | 50 |
| 12 | 3 | 53 |
| 12 | 4 | 2 |
| 12 | 5 | 34 |
| 14 | 1 | 1 |
| 14 | 2 | 24 |
| 14 | 3 | 23 |
| 14 | 4 | 1 |
| 14 | 5 | 13 |
| 15 | 1 | 1 |
| 15 | 2 | 20 |
| 15 | 3 | 48 |
| 15 | 4 | 3 |
| 15 | 5 | 7 |
| 19 | 1 | 1 |
| 19 | 2 | 7 |
| 19 | 3 | 7 |
| 19 | 4 | 3 |
| 19 | 5 | 2 |

The invention claimed is:

1. A process for printing an image on a substrate comprising applying thereto a composition by means of an ink jet printer wherein said composition comprises a liquid medium and a compound of Formula (1) or salt thereof:

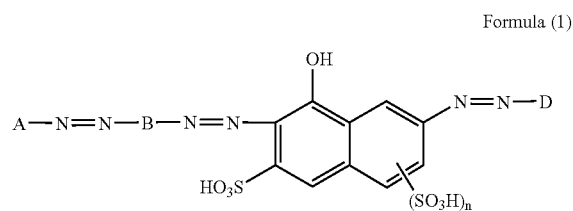

Formula (1)

wherein:

A is optionally substituted phenyl or naphthyl provided A is not 2-sulpho-4-methoxyphenyl;

B is optionally substituted phenylene or naphthylene;

n is 0 or 1;

D is a pyrazolonyl group; and wherein the liquid medium comprises an organic solvent.

2. A process according to claim 1 wherein substituents on A in Formula (1) are selected from the group consisting of hydroxy, halo, nitro, cyano, carboxy, sulpho, phosphato, optionally substituted amino, optionally substituted acylamino, optionally substituted ureido, optionally substituted $C_{1-6}$-alkyl, optionally substituted $C_{1-6}$-alkoxy, optionally substituted $C_{1-10}$-alkylthio, optionally substituted aryl, optionally substituted $C_{1-6}$-alkyl sulphonyl and optionally substituted sulphonamido.

3. A process according to claim 2 wherein substituents on A in Formula (1) are selected the group consisting of from hydroxy, halo, nitro, cyano, carboxy, sulpho, phosphato, optionally substituted amino, optionally substituted acylamino, optionally substituted ureido, optionally substituted $C_{1-6}$-alkyl, optionally substituted $C_{1-10}$-alkylthio, optionally substituted aryl, optionally substituted $C_{1-6}$-alkyl sulphonyl and optionally substituted sulphonamido.

4. A process according to claim 3 wherein A in Formula (1) is selected from the group consisting of 3,5-dicarboxyphenyl, 4-sulphophenyl, 4-carboxyphenyl, 4-sulpho-2-carboxyphenyl, 4-nitro-2-methylphenyl, 4-amino-2-sulphophenyl, 2-sulpho-4-acetamidophenyl, 2-carboxy-4-acetamidophenyl, 6-sulphonaphth-1-ylene and 7-sulphonaphth-1-ylene.

5. A process according to claim 1 wherein D is a pyrazolonyl group carrying at least one carboxy, sulpho or phosphato group.

6. A process according to claim 1 which contains a further colorant selected from the group consisting of black, magenta and yellow colorants and combinations thereof.

7. A process according to claim 1 wherein:

A is phenyl carrying one or two substituents selected from the group consisting of carboxy, sulpho, amino, methyl, methoxy and acetamido, provided A is not 2-sulpho-4-methoxyphenyl;

B is phenylene or naphthylene carrying one or two substituents selected from the group consisting of sulpho, methyl, methoxy and 2-hydroxyethoxy;

n is 0 or 1;

D is of Formula (2a) or (2b);

Formula (2a)

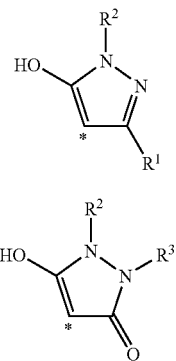

Formula (2b)

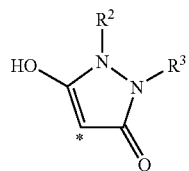

R¹ is H, methyl or carboxy; and

R² and R³ are each independently phenyl or phenyl carrying one or two substituents selected from the group consisting of sulpho and carboxy.

8. A process according to claim 1, with the proviso that A is free from nitro groups when A is optionally substituted phenyl.

9. A process according to claim 8 wherein

A is phenyl carrying one or two substituents selected from the group consisting of carboxy, sulpho, amino, methyl, methoxy and acetamido, provided A is not 2-sulpho-4-methoxyphenyl;

B is phenylene or naphthylene carrying one or two substituents selected from the group consisting of sulpho, methyl, methoxy and 2-hydroxyethoxy;

n is 0 or 1;

D is of Formula (2a) or (2b)

Formula (2a)

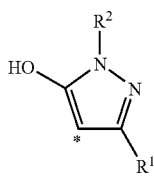

Formula (2b)

R² and R³ are each independently phenyl or phenyl carrying one or two substituents selected from the group consisting of sulpho and carboxy.

10. An ink jet printer cartridge, optionally refillable, comprising one or more chambers and a composition, wherein the composition is present in at least one of the chambers and the composition comprises a liquid medium and a compound of Formula (1) or salt thereof:

Formula (1)

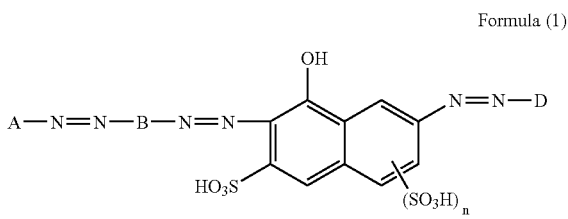

wherein:

A is optionally substituted phenyl or naphthyl provided A is not 2-sulpho-4-methoxyphenyl;

B is optionally substituted phenylene or naphthylene;

n is 0 or 1;

D is a pyrazolonyl group; and wherein the liquid medium comprises an organic solvent.

11. A paper, an overhead projector slide or a textile material printed by a process according to claim 1.

\* \* \* \* \*